United States Patent
Sato et al.

(10) Patent No.: US 11,504,738 B2
(45) Date of Patent: Nov. 22, 2022

(54) COATING AND METHOD FOR FORMING THE SAME

(71) Applicants: IHI Corporation, Koto-ku (JP); TOCALO Co., Ltd, Kobe (JP)

(72) Inventors: Naoki Sato, Tokyo (JP); Nobuhiko Kubota, Tokyo (JP); Koki Hamada, Tokyo (JP); Tatsuo Suidzu, Hyogo (JP); Kazuhiro Takeuchi, Kanagawa (JP)

(73) Assignees: IHI Corporation, Koto-ku (JP); TOCALO Co., Ltd, Kobe (JP)

( * ) Notice: Subject to any disclaimer, the term of this patent is extended or adjusted under 35 U.S.C. 154(b) by 49 days.

(21) Appl. No.: 17/009,315

(22) Filed: Sep. 1, 2020

(65) Prior Publication Data
US 2020/0391243 A1 Dec. 17, 2020

Related U.S. Application Data

(63) Continuation of application No. PCT/JP2018/007942, filed on Mar. 2, 2018.

(51) Int. Cl.
| | |
|---|---|
| *B05D 1/02* | (2006.01) |
| *B05D 3/02* | (2006.01) |
| *B05D 5/00* | (2006.01) |
| *F27D 1/00* | (2006.01) |

(52) U.S. Cl.
CPC ............. *B05D 1/02* (2013.01); *B05D 3/0254* (2013.01); *B05D 5/00* (2013.01); *F27D 1/0006* (2013.01)

(58) Field of Classification Search
CPC ................................ B05D 1/02; B05D 3/0254
See application file for complete search history.

(56) References Cited

U.S. PATENT DOCUMENTS

| | | | |
|---|---|---|---|
| 4,456,635 A | 6/1984 | Albanese et al. | |
| 6,143,107 A * | 11/2000 | Hounsel | F22B 37/36 156/304.3 |

(Continued)

FOREIGN PATENT DOCUMENTS

| | | |
|---|---|---|
| CN | 101918186 A | 12/2010 |
| JP | 6-272817 A | 2/1994 |
| JP | 6-272817 A | 9/1994 |

(Continued)

OTHER PUBLICATIONS

International Search Report dated Apr. 3, 2018 in PCT/JP2018/007942 filed Mar. 2, 2018, 2 pages

(Continued)

*Primary Examiner* — Nathan T Leong
(74) *Attorney, Agent, or Firm* — Oblon, McClelland, Maier & Neustadt, L.L.P.

(57) ABSTRACT

A coating is formed on a surface of a base material of a furnace, and includes a base layer and a sliding material layer that is formed on a surface of the base layer and contains an oxide ceramic and a compound having a layered crystal structure. The sliding material layer causes the collided ashes to be slipped and facilitates the drop off of the adhered ashes. The base material forms a heat transfer tube or a wall surface of the furnace. The coating is also applied to a coal gasification furnace, a pulverized coal fired boiler, a combustion apparatus, or a reaction apparatus containing a furnace.

2 Claims, 9 Drawing Sheets

(56) References Cited

U.S. PATENT DOCUMENTS

| | | | | |
|---|---|---|---|---|
| 2005/0053892 A1* | 3/2005 | Shiromizu | ............... | F23M 5/00 432/251 |
| 2017/0314613 A1 | 11/2017 | Yasuo et al. | | |

FOREIGN PATENT DOCUMENTS

| | | | |
|---|---|---|---|
| JP | 8-119775 | A | 5/1996 |
| JP | 8-120276 | A | 5/1996 |
| JP | 9-143797 | A | 6/1997 |
| JP | 10-237617 | A | 9/1998 |
| JP | 11-351505 | A | 12/1999 |
| JP | 2001-49379 | A | 2/2001 |
| JP | 2003-112984 | A | 4/2003 |
| JP | 2003-120902 | A | 4/2003 |
| JP | 2003-262490 | A | 9/2003 |
| JP | 2003-287395 | A | 10/2003 |
| JP | 2004-315309 | A | 11/2004 |
| JP | 2005-146409 | A | 6/2005 |
| JP | 2006-137989 | A | 6/2006 |
| JP | 2006-144061 | A | 6/2006 |
| JP | 2007-31565 | A | 2/2007 |
| JP | 2007031565 | * | 2/2007 |
| JP | 2011-169476 | A | 9/2011 |
| JP | 2011-169521 | A | 9/2011 |
| JP | 2012-251228 | A | 12/2012 |
| JP | 2016-191080 | A | 11/2016 |
| JP | 2016-196820 | A | 11/2016 |
| JP | WO 2015/198557 | A1 | 4/2017 |
| TW | 201636443 | A | 10/2016 |

OTHER PUBLICATIONS

Taiwanese Office Action dated Dec. 22, 2018 for corresponding Taiwanese Application No. 20181221.

Taiwanese Office Action Decision to Grant dated Jul. 1, 2019 for corresponding Taiwanese Application No. 20190627.

Office Action dated Jun. 22, 2021 in corresponding Japanese Patent Application No. 2016-256851, 2 pages.

Japanese Office Action dated Feb. 16, 2021 in Japanese Patent Application No. 2016-256851, 2 pages.

Japanese Office Action dated Sep. 29, 2020 in Japanese Patent Application No. 2016-256851 (with English language translation), 5 pages Combined Chinese Office Action and Search Report dated Jan. 4, 2022 in corresponding Chinese Patent Application No. 201880090255.8 (with English Translation of Category of Cited Documents) 9 pages

* cited by examiner

(a) STAINLESS STEEL MATERIAL (WITHOUT COATING)

(b) ONLY BASE LAYER (c) BASE LAYER AND SLIDING MATERIAL LAYER

| COATING | BEFORE HEATING | AFTER HEATING | AFTER AIR BLOWING |
|---|---|---|---|
| NO COATING (STEEL STOCK) |  |  |  |
| BASE LAYER |  |  |  |
| BASE LAYER AND SLIDING MATERIAL LAYER |  |  |  |

| COATING | BEFORE HEATING | AFTER HEATING | AFTER AIR BLOWING |
|---|---|---|---|
| NO COATING (STAINLESS STEEL MATERIAL) | | | |
| BASE LAYER | | | |
| BASE LAYER AND SLIDING MATERIAL LAYER | | | |

FIG. 9

COATING AND METHOD FOR FORMING THE SAME

CROSS REFERENCE TO RELATED APPLICATION

This application claims priority from PCT International Application No. PCT/JP2018/007942 filed Mar. 2, 2018, the entire disclosure of which is hereby incorporated by reference.

TECHNICAL FIELD

The present disclosure relates to a coating that is formed on a surface of a base material of a furnace to suppress the adhesion of ashes to furnaces such as a coal gasification furnace, and a pulverized coal fired boiler and a method for forming the same.

RELATED ART

Ashes are generated by burning and a gasification reaction in the coal gasification furnace and by burning in the pulverized coal fired boiler. Ashes that are incombustible materials are adhered/deposited to/on a surface of a heat transfer tube and a heat thermal resistance of the entire heat transfer tube increases, which is lead to a reduction in a heat-transfer efficiency. In a case where ashes are deposited in an enlarged manner, the damage of the heat transfer tube is triggered by clogging of a flow path and the fall of a huge ash mass, and accordingly, a plant is caused to be stopped. Conventionally, ashes are regularly dropped off by blowing from a sootblower that sprays sterns and air or in a case of the pulverized coal fired boiler, by using a thermal shock of a temperature alteration by a temporal load fluctuation in combination.

On the other hand, to suppress the adhesion of ashes to the heat transfer tube, the following two types of techniques are provided. The first technique is a technique of reforming ash particles by using additives and of suppressing the adhesion of ash particles to the heat transfer tube by increasing an ash particle diameter and raising an ash melting point by using the additives to coal as a fuel. The second technique is a technique of suppressing the adhesion of ashes by forming a coating on the heat transfer tube. For example, provided is a technique of controlling the adhesion of ash particles by forming the coating that controls wettability of the surface of the heat transfer tube by means of thermal spraying and the like to exhibit hydrophobicity against melted ash particles (see D1). Further provided is a technique of removing the adhered ashes by a difference in the heat expansion by an application of ceramic and titanium oxidation (see D2 and D3). Still further provided is a technique of facilitating an easy removal of the adhered ashes by applying a gel-like composition on the surface of the heat transfer tube (see D4 and D5).

RELATED ART DOCUMENTS

D1: JP. 2005-146409 A
D2: JP 2003-262490 A
D3: JP 2003-120902 A
D4: JP 2011-169521 A
D5: JP.2011-169476 A

SUMMARY

However, an operation of removing ashes by using the sootblower and by means of the thermal shock is expensive, and thus, the reduction of a running cost is demanded. Further, the conventional techniques of suppressing the adhesion of ashes to the heat transfer tube have not been applicable to all coal types, and sometimes had no effects to some coal types. Therefore, a technique that can suppress the adhesion of ashes to the heat transfer tube and can cope with the expansion of coal types is demanded.

The present disclosure is made in consideration of the above described situations, and an object of the present disclosure is to provide a coating that suppresses the adhesion of ashes to a heat transfer tube, reduces a running cost and can cope with the expansion of a coal type, and a method for forming the same.

To solve the above described problem, a coating according to the present application is a coating formed on a surface of a base material of a furnace and includes a sliding material layer containing an oxide ceramic and a compound having a layered crystal structure as a topcoat.

The coating according to the present application may have a single layer structure formed only from the sliding material layer. That is, the sliding material layer may be formed on the surface of the base material of the furnace.

The coating according to the present application may contain a base layer formed from a corrosion-resistance material or a fire-resistant material under the sliding material layer. The base material may be formed from a steel material or a fire-resistant material. The base material may form the heat transfer tube or a wall surface of the furnace.

In the furnace according to the present application, the coating is formed on the surface of the base material of the furnace. A coal gasification furnace, a pulverized coal fired boiler, a combustion apparatus, or a reaction apparatus according to the present application contains the furnace.

A method for forming the coating according to the present application is a method for forming the coating formed on the surface of the base material of the furnace, and the method includes a step of applying a slurry of the sliding material that contains oxide ceramic, a compound having a layered crystal structure, and silicone, and thereafter burning the slurry to form a coating, as a step of forming a topcoat.

According to the present disclosure, it is possible to reduce a running cost and cope with the expansion of fuel types. Furthermore, the suppression of adhesion of ashes to the furnace can prevent clogging of a flow path and the damage on the heat transfer tube and enables a stable operation of a plant.

EMBODIMENTS

Figure 1:
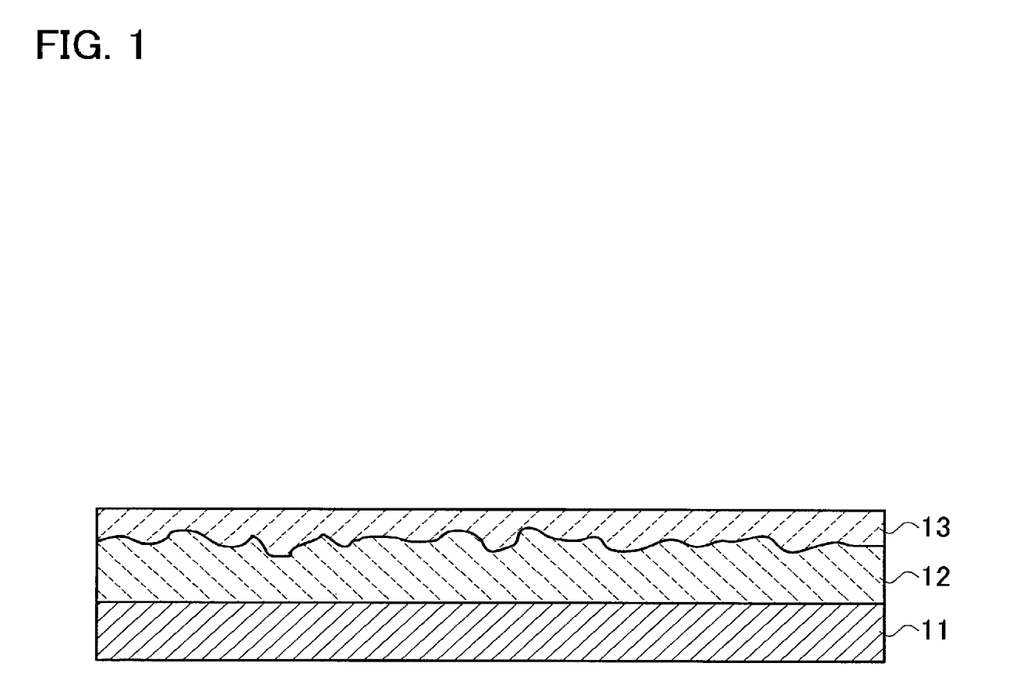
FIG. 1 is a cross sectional view illustrating a schematic constitution of a coating according to the present embodiment.

A coating according to the present embodiment and a method for forming the same are described below in details with reference to the accompanying diagrams. FIG. 1 is a cross sectional view illustrating the coating according to the present embodiment. The coating according to the present embodiment suppresses the adhesion of ashes to a furnace and facilitates the drop off of ashes from the furnace.

As illustrated in FIG. 1, the coating is formed from a base layer 12 formed on a surface of a base material 11 and the sliding material layer 13 formed on a surface of the base layer 12 as a topcoat. The base material 11 may be a steel material and a fire-resistant material that form a wall surface in the furnace such as a coal gasification furnace and a pulverized coal fired boiler or may be a carbon steel material and a stainless steel material that form a heat transfer tube. Examples of the fire-resistant material include high-alumina bricks, chromium/magnesia bricks and the like.

The base layer 12 is formed on the surface of the base material 11 with a predetermined thickness and causes the sliding material layer 13 to be fixed by having a large surface roughness. The thickness of the base layer 12 may be 200 to 1000 µm. The surface roughness of the base layer 12 may be an arithmetic average roughness Ra of 1 to 20 µm. The base layer 12 may be an inorganic material such as metal and ceramics and suppresses the enhancement of adhesion of ashes by the corrosion reaction when the surface of the base material 11 is exposed to ashes for a long time. By forming the base layer 12 from a corrosion-resistance material, the corrosion resistance of the furnace can be improved. Examples of the corrosion-resistance material include a high chromium alloy and the like. Further, by forming the base layer 12 from the fire-resistant material, the fire resistance of the furnace can be improved. Examples of the fire-resistant material include castable refractories.

The sliding material layer 13 is formed on the surface of the base layer 12 with a predetermined thickness with a sliding material. The thickness of the sliding material layer 13 may be 10 to 90 µm. The sliding material layer 13 includes oxide ceramics and a compound having a layered crystal structure. Examples of oxide ceramics include oxides that contain at least one of silicon, aluminium, chromium, manganese and iron elements. The layered crystal structure indicates a crystal structure in which atoms or atom group are arranged in a plane to form a sheet structure and the repetition of the sheet structure is found in a direction perpendicular to the plane. Among the above, a structure belonging to a hexagonal system is also called as a graphite-type crystal structure and particularly has a high symmetry. Examples of the compound forming the graphite-type crystal structure include graphite, manganese sulfide, graphite fluoride, boron nitride, molybdenum disulfide and tungsten disulfide. The sliding material layer 13, by an effect of lowering the frictional resistance of the surface of its layered crystal structure, causes collided ash particles to be slipped and improves a drop-off property of adhered ashes. Further, the sliding material layer 13 suppresses the corrosion reaction between ashes and the base layer 12 under a high temperature environment by the durability of oxide ceramics.

Such coating can be obtained by forming the base layer 12 on the surface of the base material 11 that forms heat transfer tubes and the wall surface of furnaces of the coal gasification furnace and the pulverized coal fired boiler and by forming the sliding material layer 13 on the surface of the base layer 12 as a topcoat. The base layer 12 may be formed by thermal spraying or applying an inorganic material. The sliding material layer 13 may be formed by applying or spraying a slurry of the sliding material. If the sliding material is caused to contain silicone in addition to oxide ceramics and the compound having the layered crystal structure, a coating property is improved. Silicone is a polymer having a main chain formed by alternately bonding silicon having an organic group and oxygen and examples of silicone include a silicone resin, a silicone rubber, silicone oil, a silicone grease and the like. The ratio of oxide ceramics contained in the sliding material may be 1 to 30% by mass. The ratio of the compound having the layered crystal structure contained in the sliding material may be 10 to 30% by mass. The ratio of silicone contained in the sliding material may be 10 to 50% by mass. The coating may be applied to a furnace of a combustion apparatus or a reaction apparatus in addition to the furnaces of the coal gasification furnace and the pulverized coal fired boiler.

Example 1

In Example 1, a horizontal combustion furnace was used as a furnace and an ash adhesion test was conducted for the coating according to the present embodiment. In the test of Example 1, a temperature in the combustion furnace was simulated, and how ashes were adhered to a surface of a probe formed with the coating exposed to the combustion furnace was observed.

Figure 2:
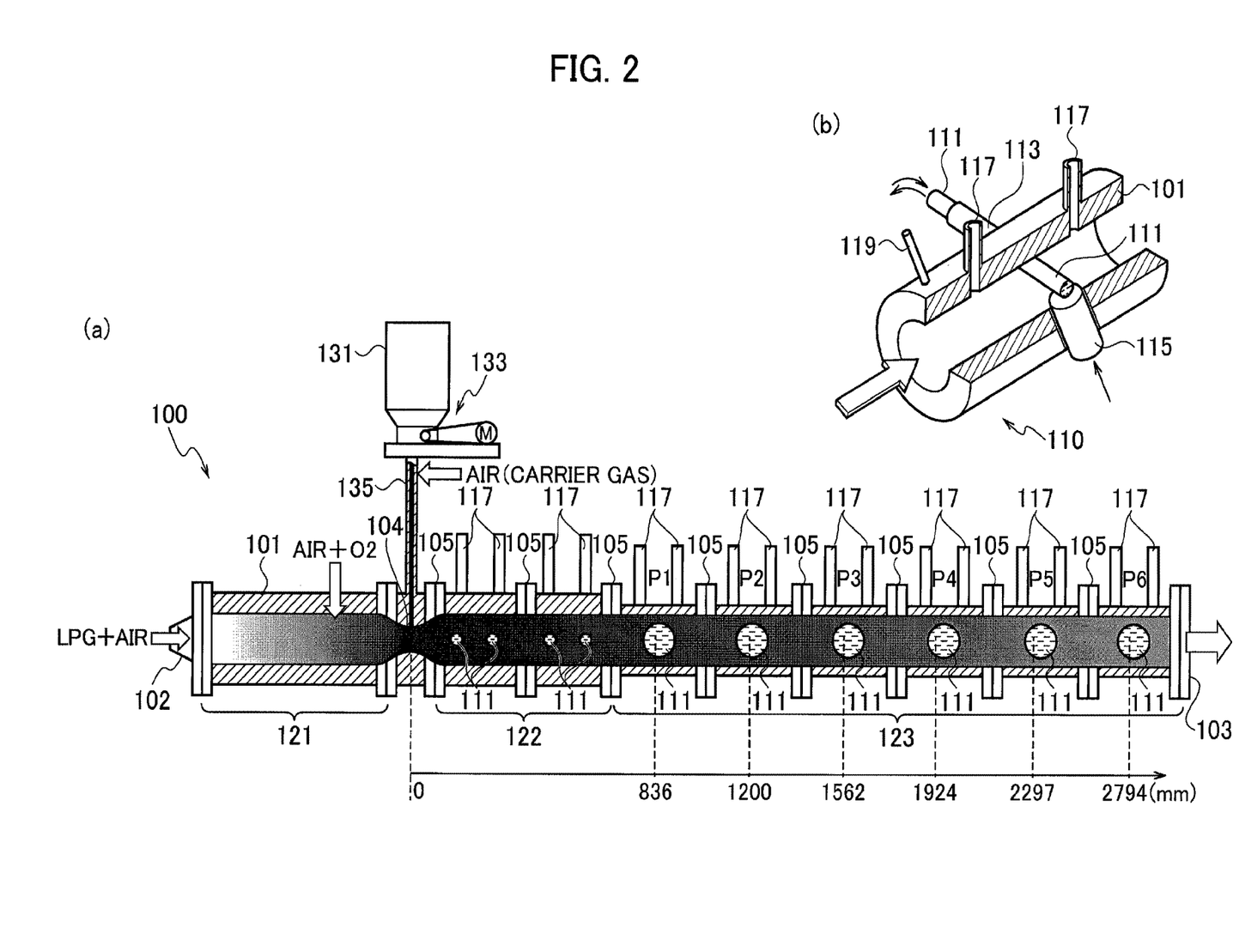
FIG. 2 is a diagram for illustrating a constitution of a combustion furnace used for an ash adhesion test in Example 1.

FIG. 2 is a cross sectional view illustrating a structure of the combustion furnace used for the ash adhesion test. As illustrated in FIG. 2(a), the combustion furnace 100 is constituted in a horizontal type in which a combustion chamber 101 extends substantially horizontally along a flow path from an inlet 102 to an outlet 103. In the combustion chamber 101, a plurality of segments are connected with one another in a separable manner by flanges 105 and constitute a preheating unit 121, a combustion unit 122, and an ash adhesion unit 123 along the flow path.

In the preheating unit 121, LPG and air are supplied from the inlet 102, in the middle of the flow path, air and an oxygen gas are further supplied, and accordingly, LPG burns. A throat 104 with a narrowed flow path is formed at a transition part from the preheating unit 121 to the combustion unit 122. The throat 104 receives a pulverized coal stored in a tank 131 by a coal supply device 133 through a supply path 135 together with air of a carrier gas. The quantity of heat of the supplied pulverized coal was 35 kW. In the combustion unit 122, the pulverized coal supplied from the throat 104 burns. In the ash adhesion unit 123, ashes generated by burning of the pulverized coal are adhered to the probe 111 installed in the combustion chamber 101 and the wall surface.

FIG. 2(b) is a cutaway perspective view illustrating a constitution of each segment 110 constituting the ash adhesion unit 123 in the combustion chamber 101. The segments 110 are connected to one another by the flanges 105, but in this perspective view, the flanges 105 are omitted for simplification. The cylindrical segments 110 are formed with a probe port 113 for introducing the probe 111 to an inside, an observation port 115, a sampling port 117, and a thermocouple port 119. The water-cooled probe 111 extends in the combustion chamber 101 from the probe port 113 and the probe can be visually observed form the observation port 115. The diameter of the probe 111 was 31.8 mm. A sample of the combustion chamber 101 can be collected from the sampling port 117 and a thermocouple is inserted into the combustion chamber 101 from the thermocouple port 119.

Reference numerals P1 to P6 illustrated in FIG. 2(a) indicate probes installed in the ash adhesion unit 123 of the combustion chamber 101. The probes P1 to P6 are located at positions distant from the throat 104 in a direction of the flow path by 836, 1200, 1562, 1924, 2297, and 2794 mm respectively.

As shown in Table 1, the test was conducted under both a slugging condition and a fouling condition individually. The slugging condition is a condition in which ashes melted in an environment in which a gas temperature is equal to or higher than a softening temperature of ashes are adhered to the surface of the base material. By supposing a wall surface inside the furnace and a wall surface at an outlet of the furnace, in the slugging condition, a carbon steel material (SS400a steel) was used for the base material 11. The fouling condition is a condition in which ashes are adhered to the surface of the base material in an environment in which the gas temperature is equal to or lower than the softening temperature of ashes. By supposing a heat transfer tube located at the rear of the furnace, in the fouling condition, a stainless steel material (SUS304 steel) was used for the base material 11. The base layer 12 is a nickel-chromium alloy layer and is formed based on an atmospheric plasma spraying method. The thickness of the base layer 12 was 450 μm. The surface roughness of the base layer 12 was 10 μm in an arithmetic average roughness Ra. The sliding material layer 13 is a fired coat of a mixture of oxide ceramics having iron and manganese and boron nitride, contains 25% by mass of oxide ceramics, 15% by mass of boron nitride, and 40% by mass of silicone, the slurry of the mixture containing a remainder as an organic solvent was prepared, and after applying the slurry on the base layer 12, the slurry was burned at 500° C. for 30 minutes to form a coating. The thickness of the sliding material layer 13 was 30 μm.

TABLE 1

| TEST CONDITION | SLUGGING CONDITION | FOULING CONDITION |
| --- | --- | --- |
| COAL | BROWN COAL | BROWN COAL |
| FURNACE TEMPERATURE (° C.) | 1400 | 1000 |
| PROBE SURFACE TEMPERATURE (° C.) | 400 TO 500 | 700 TO 800 |
| COATING | CARBON STEEL MATERIAL WITHOUT COATING BASE LAYER BASE LAYER + SLIDING MATERIAL LAYER | STAINLESS STEEL MATERIAL WITHOUT COATING BASE LAYER BASE LAYER + SLIDING MATERIAL LAYER |

Figure 3:
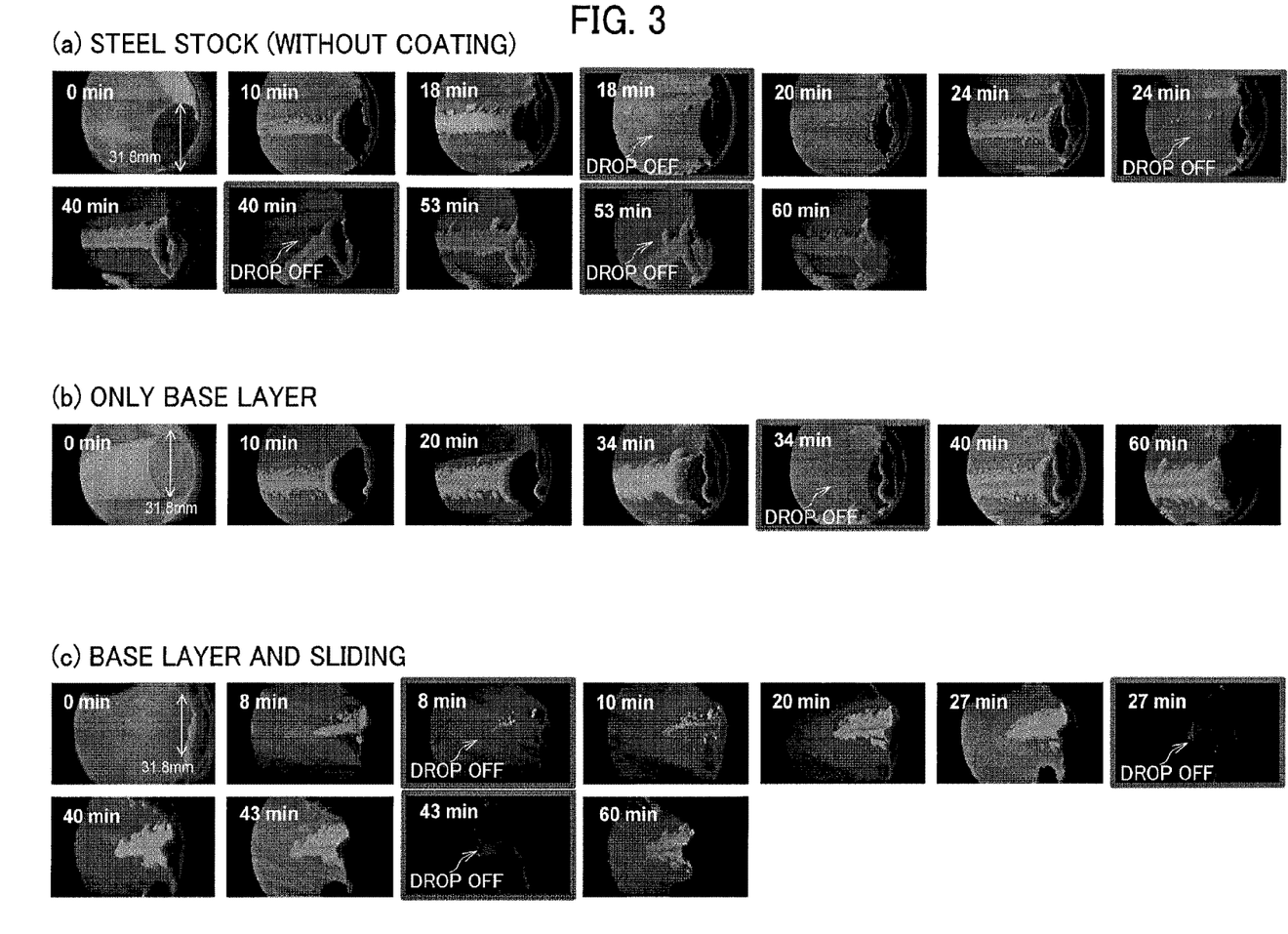
FIG. 3 is a photograph showing a result of a test conducted under a slugging condition in Example 1.

FIG. 3 is a photograph showing a result of the test conducted in the combustion furnace illustrated in FIG. 2 under the slugging condition. As illustrated in FIG. 3(a), in a case where the carbon steel material (SS400 steel) without the coating is used for the probe 111, after an elapse of 18 minutes, 40 minutes, and 53 minutes from the start of the test, the drop off of ashes from the probe 111 was observed. As illustrated in FIG. 3(b), in a case where the carbon steel material only formed with the base layer is used, after an elapse of 34 minutes from the start of the test, the drop off of ashes from the probe 111 was observed. As illustrated in FIG. 3(c), if the carbon steel material formed with the coating formed from the base layer and the sliding material layer is used, after an elapse of 8 minutes, 27 minutes, and 43 minutes from the start of the test, the drop off of ashes from the probe 111 was observed.

Figure 4:
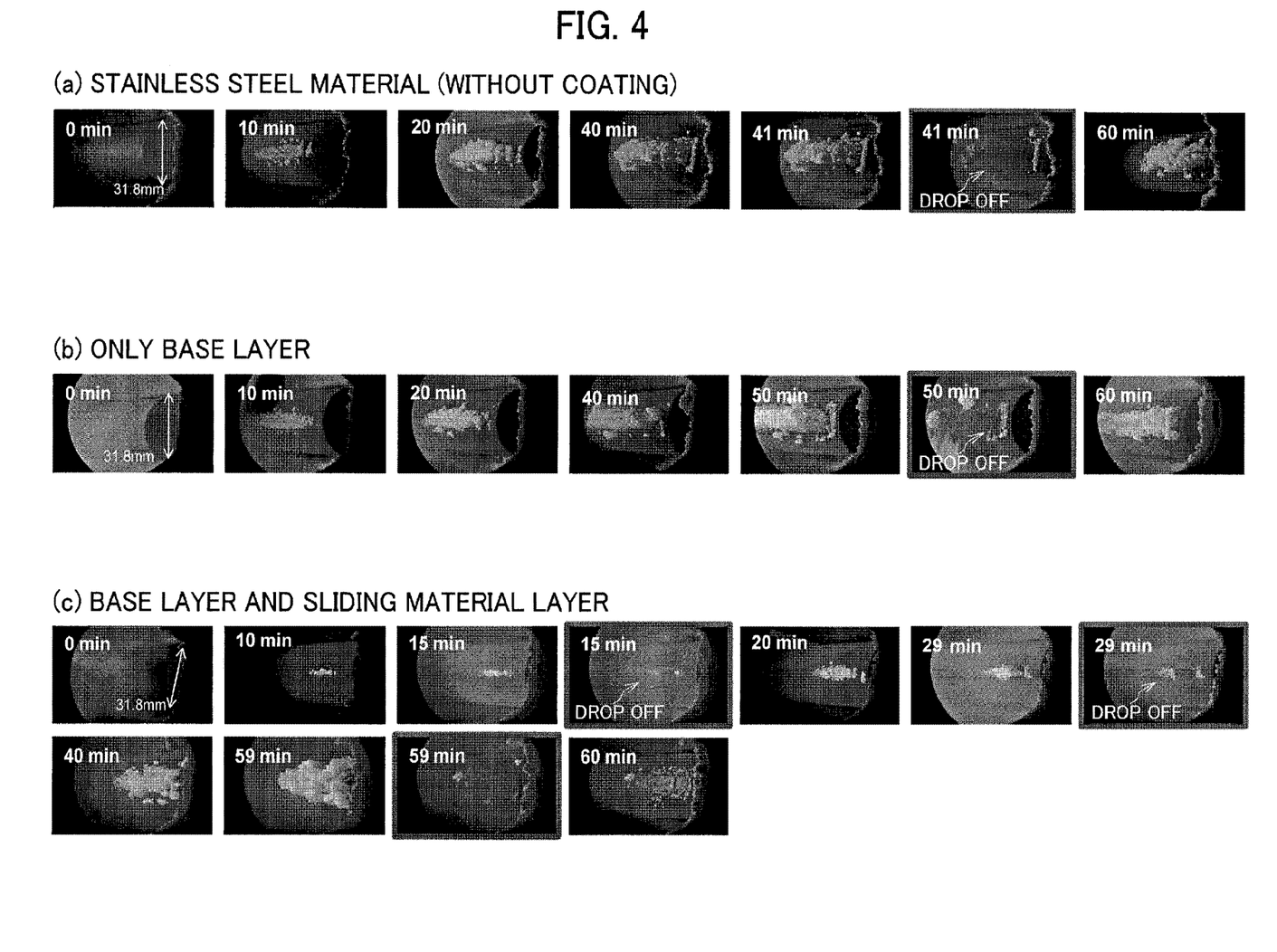
FIG. 4 is a photograph showing a result of a test conducted under a fouling condition in Example 1.

FIG. 4 is a photograph showing a result of the test conducted in the combustion furnace illustrated in FIG. 2 under the fouling condition. As illustrated in FIG. 4(a), in a case where the stainless steel material (SUS304 steel) without the coating is used for the probe 111, after an elapse of 41 minutes from the start of the test, the drop off of ashes from the probe 111 was observed. As illustrated in FIG. 4(b), in a case where the stainless steel material formed only with the base layer is used, after an elapse of 50 minutes from the start of the test, the drop off of ashes from the probe 111 was observed. As illustrated in FIG. 4(c), in a case where the stainless steel material formed with the coating formed from the base layer and the sliding material layer is used, after an elapse of 15 minutes, 29 minutes, and 59 minutes from the start of the test, the drop off of ashes from the probe 111 was observed.

In Example 1, under both the slugging condition and the fouling condition, it was confirmed that the drop off of ashes is more facilitated in a case where the coating is formed to the steel material than a case without coating and a case where only the base layer is formed on the steel material. Accordingly, it was recognized that the coating formed from the base layer and the sliding material layer according to the present embodiment has an effect of suppressing the adhesion of ashes.

Example 2

In Example 2, the adhesion of ashes to the furnace was tested by burying a test piece in simulated ashes in an electric furnace and heating the test piece. In this test, in the electric furnace, the simulated ashes and the test piece were heated to a temperature equivalent to a surface temperature of the furnace and a ratio of the weight of adhered ashes and the weight of ashes removed by the air blow was measured.

Figure 5:
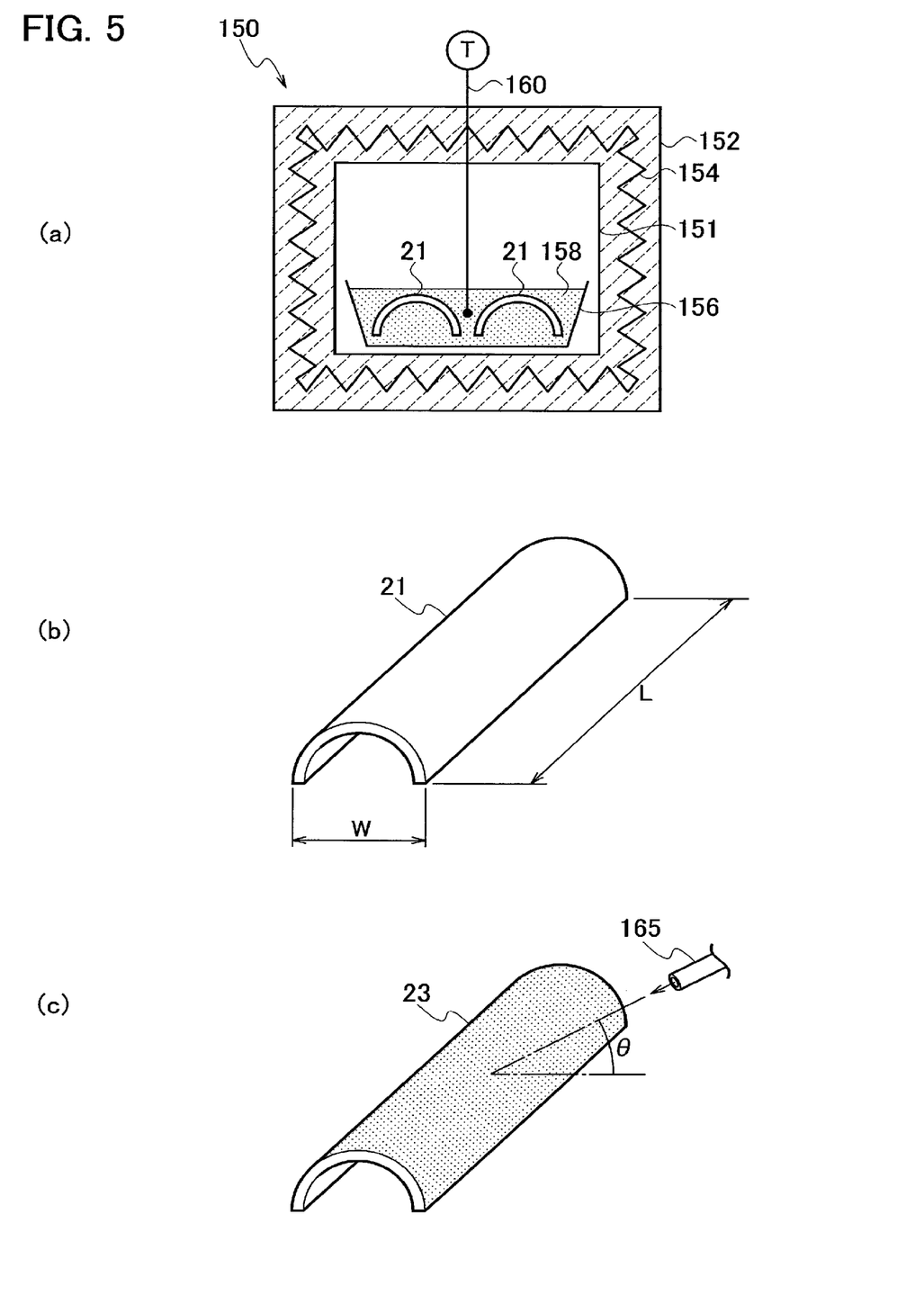
FIG. 5 is a diagram for illustrating an electric furnace used for an ash adhesion test in Example 2.

FIG. 5 is a diagram illustrating the ash adhesion test. As in a cross sectional view of the electric furnace 150 illustrated in FIG. 5(a), in the electric furnace 150, a heating chamber 151 is formed by a furnace material 152 and in the furnace material 152, a heater 154 is disposed around the heating chamber 151. A dish-like container 156 containing simulated ashes 158 is placed on a bottom surface of the heating chamber 151. The temperature of the simulated ashes 158 in the container 156 is monitored by a thermocouple 160.

FIG. 5(b) is a perspective view illustrating the test piece. The test piece 21 has a shape in which a tube with a predetermined length is cut with a cross section passing through a central axis, and has a width w of 31.8 mm and a length l of 30 mm. FIG. 5(c) is a perspective view illustrating the test piece 23 to which the simulated ashes 158 were adhered by the test. The simulated ashes 158 are removed from the test piece 23 adhered with the simulated ashes 158 by the air blow from a direction forming an angle θ that is 45 degrees from the cross section with respect to the central axis.

By using the electric furnace 150 as illustrated in FIG. 5(a), the temperature in the furnace was simulated, and a state of the simulated ashes 158 adhered to the test piece 21 that is buried in the simulated ashes 158 was observed. As shown in Table 2, the test was conducted for both the slugging condition and the fouling condition individually. Under both conditions, the simulated ashes 158 were prepared by mixing powders of potassium sulfate ($K_2SO_4$), sodium sulfate ($Na_2SO_4$), and ferric oxide ($Fe_2O_3$) at a molar ratio of 1:1:1.5.

TABLE 2

| TEST CONDITION | SLUGGING CONDITION | FOULING CONDITION |
|---|---|---|
| HEATING TEMPERATURE (° C.) | 450 | 650 |
| HEATING TIME (H) | 100 | 100 |
| COATING | CARBON STEEL MATERIAL WITHOUT COATING BASE LAYER BASE LAYER + SLIDING MATERIAL LAYER | STAINLESS STEEL MATERIAL WITHOUT COATING BASE LAYER BASE LAYER + SLIDING MATERIAL LAYER |

Figure 6:
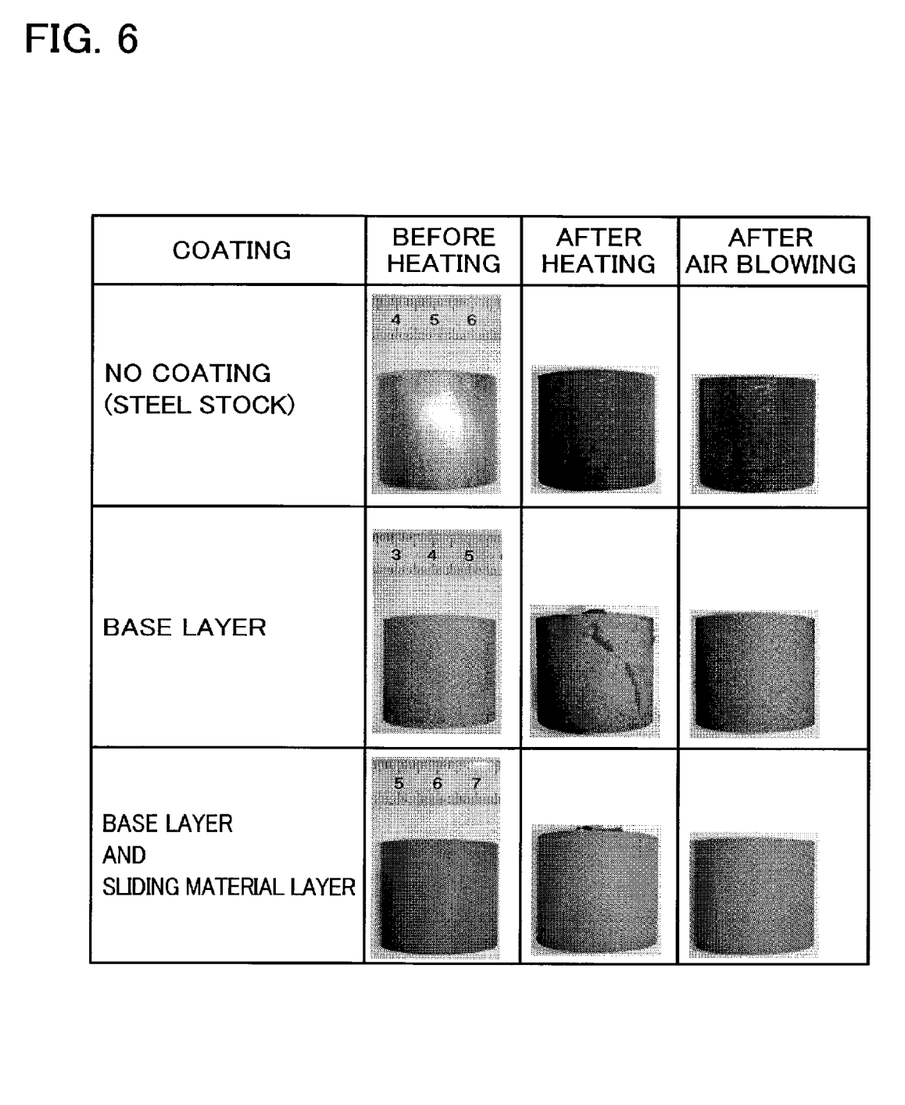
FIG. 6 is a photograph showing a result of a test conducted under a slugging condition in Example 2.

FIG. 6 is a photograph showing a result of the test conducted in the electric furnace illustrated in FIG. 5(a) under the slugging condition. In the test, as similar in Example 1, as the test piece 21, three types of materials that are the carbon steel material without the coating, the carbon steel material formed only with the base layer, and the carbon steel material formed with the coating formed from the base layer and the sliding material layer were prepared, external photographs at each of a stage before heating, a stage after heating, and a stage after air blowing were taken. Comparing these photographs, at both the stage after heating and the stage after air blowing, it was observed that a surface is more smooth and the adhesion of the simulated ashes 158 is more suppressed in a case of the carbon steel material formed with the coating than a case of the carbon steel material without the coating and a case of the carbon steel material only formed with the base layer.

Figure 7:
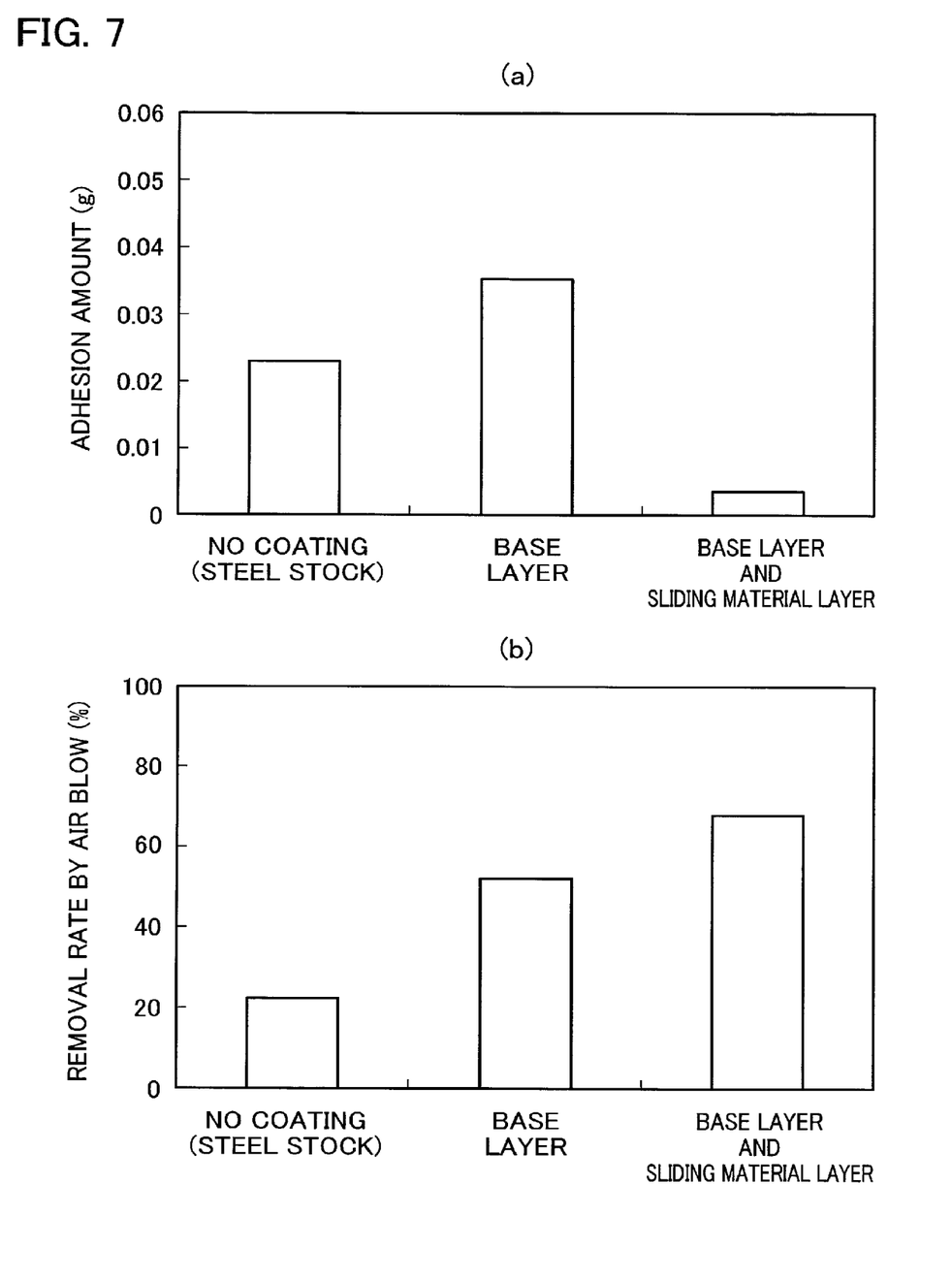
FIG. 7 is a graph illustrating a result of a test conducted under a slugging condition in Example 2.

FIG. 7 is a graph showing a result of a test of measuring the amount of ashes and the like in the electric furnace illustrated in FIG. 5(a) under the slugging condition. FIG. 7(a) is a graph showing the amount of ashes adhered to the test piece. The amount of ashes adhered to the test piece 21 was the largest in a case of the carbon steel material only formed with the base layer, the largeness of the amount of ashes is followed by a case of the carbon steel material without the coating, and the amount of ashes adhered to the test piece 21 is the smallest in a case of the carbon steel material formed with the coating formed from the base layer and the sliding material layer.

FIG. 7(b) is a graph showing a removal rate of ashes adhered to the test piece by the air blow. The removal rate of ashes is the highest in a case of the carbon steel material formed with the coating formed from the base layer and the sliding material layer, and the highness of the removal rate is followed by a case of the carbon steel material only formed with the base layer, and the removal rate is the lowest in a case of the carbon steel material without the coating.

Figure 8:
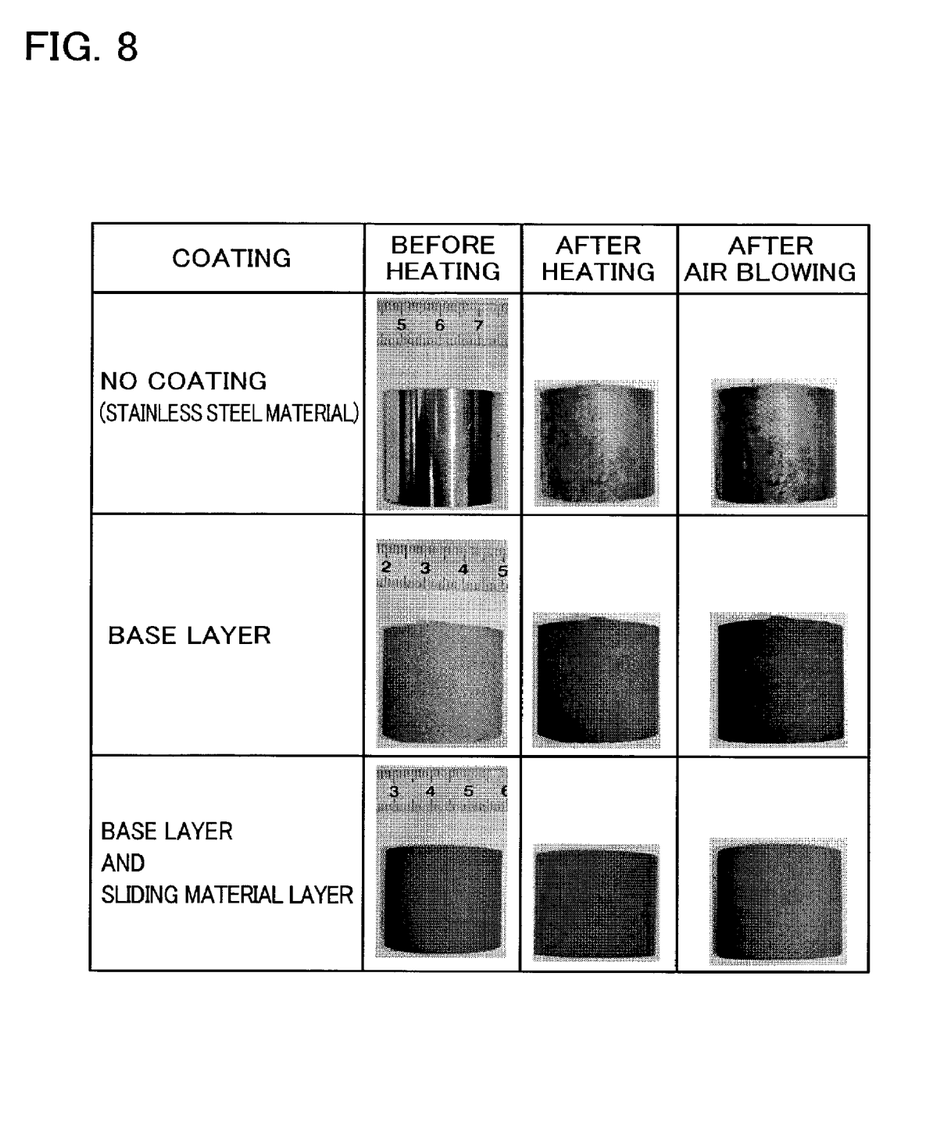
FIG. 8 is a photograph showing a result of a test conducted under a fouling condition in Example 2.

FIG. 8 is a photograph showing a result of the test conducted in the electric furnace illustrated in FIG. 5 under the fouling condition. In the test, as similar in Example 1, the test piece 23, three types of materials that are the stainless steel material (SUS304 steel) without the coating, the stainless steel material only formed with the base layer, and the stainless steel material formed with the coating formed from the base layer and the sliding material layer were prepared, and external photographs at each of a stage before heating, a stage after heating, and a stage after air blowing were taken. Comparing these photographs, at both the stage after heating and the stage after air blowing, it was observed that the adhesion of ashes is less and the adhesion of the simulated ashes 158 is more suppressed in a case of the stainless steel material formed with the coating than a case of the stainless steel material without the coating and a case of the stainless steel material only formed with the base layer.

Figure 9:
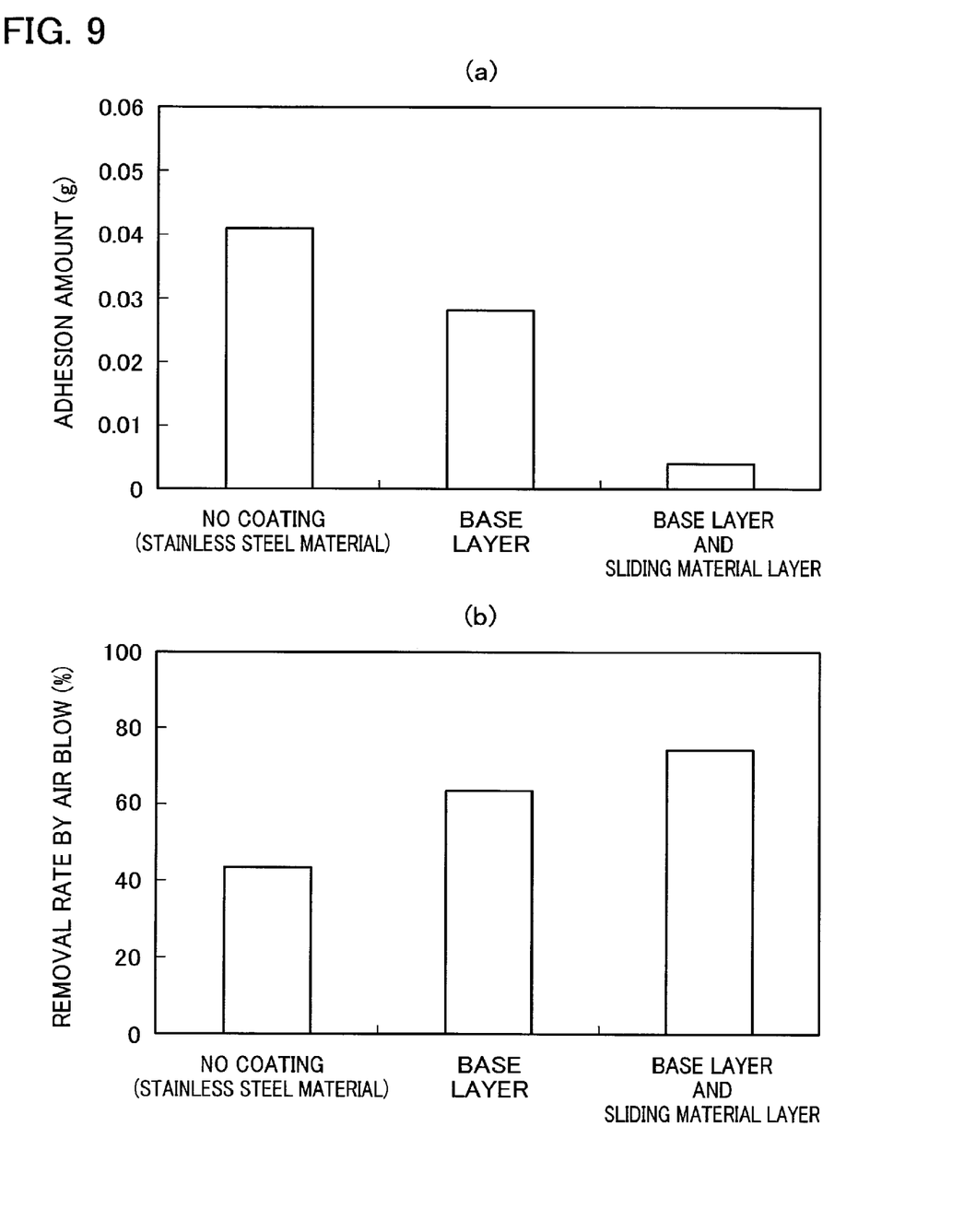
FIG. 9 is a graph showing a result of a test conducted under a fouling condition in Example 2.

FIG. 9 is a graph showing a result of a test of measuring the amount of ashes and the like in the electric furnace illustrated in FIG. 5 under the fouling condition. FIG. 9(a) is a graph showing the amount of ashes adhered to the test piece. The amount of ashes adhered to the test piece 23 was the largest in a case of the stainless steel material without the coating, and the largeness of the amount of ashes is followed by a case of the stainless steel material formed with the base layer, and the amount of ashes adhered to the test piece 23 was the smallest in a case of the stainless steel material formed with the coating formed from the base layer and the sliding material layer.

FIG. 9(b) is a graph showing a removal rate of ashes adhered to the test piece by the air blow. The removal rate of ashes is the highest in a case of the stainless steel material formed with the coating formed from the base layer and the sliding material layer, the highness of the removal rate is followed by a case of the stainless steel material formed with the base layer, and the removal rate of ashes is the lowest in a case of the stainless steel material without the coating.

In Example 2, under both the slugging condition and the fouling condition, it was confirmed that the adhesion of ashes is more suppressed and the drop off of ashes is more facilitated in a case where the coating is formed to the steel material than a case without coating and a case where only the base layer is formed on the steel material. Accordingly, it was recognized that the coating formed from the base layer and the sliding material layer according to the present embodiment has effects of suppressing the adhesion of ashes and facilitating the drop off of ashes.

What is claimed is:

1. A method for forming a coating formed on a surface of a base material of a furnace, the method comprising:
    applying or spraying a slurry of a sliding material containing an oxide ceramic, a compound including a layered crystal structure, and silicone; and
    forming a topcoat by burning the slurry to form the coating;
    wherein the slurry of the sliding material contains 1 to 30 mass % of the oxide ceramic, 10 to 30 mass % of the compound including the layered crystal structure, and 10 to 50 mass % of the silicone.

2. The method according to claim 1, wherein the base material is a heat transfer tube.

* * * * *